Nov. 13, 1962 M. A. HALL 3,063,301
CONTROL MEMBER
Filed June 10, 1959 2 Sheets-Sheet 1
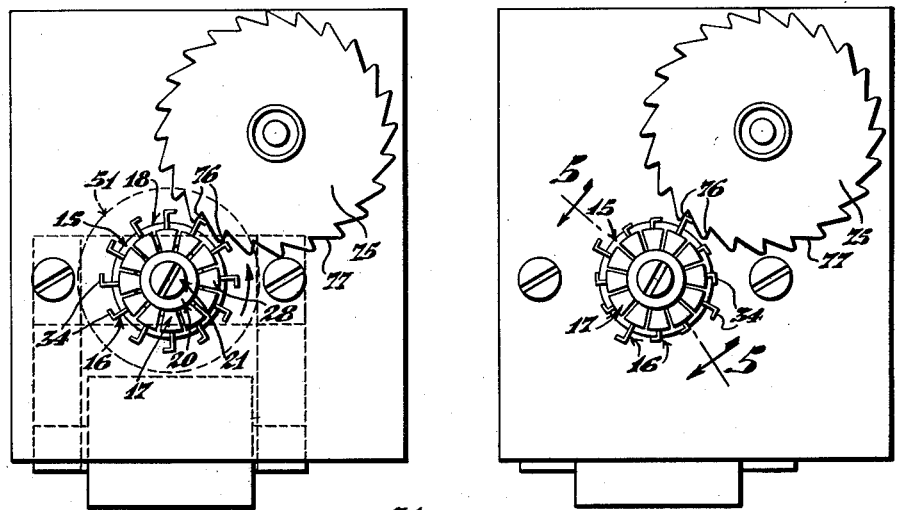
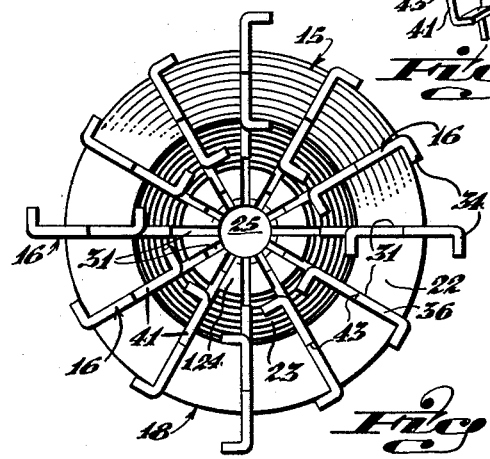
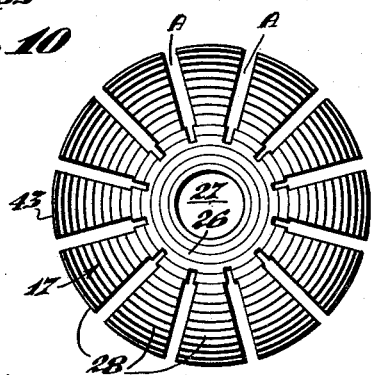
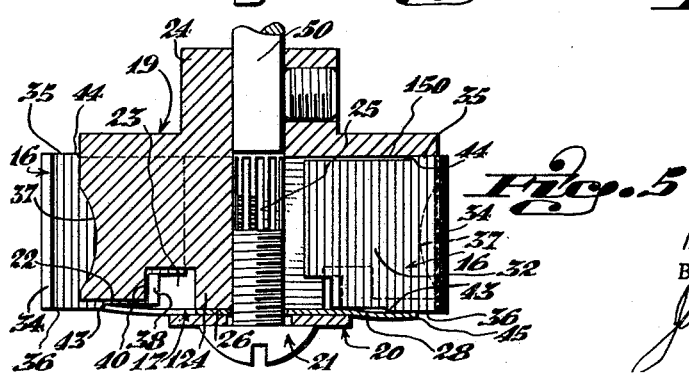
INVENTOR.
MITCHELL A. HALL
BY
J. Warren Kinney, Jr.
ATTORNEY INVENTOR.
MITCHELL A. HALL
BY
J. Warren Kinney, Jr.
ATTORNEY

United States Patent Office 3,063,301
Patented Nov. 13, 1962

3,063,301
CONTROL MEMBER
Mitchell Adam Hall, Fort Thomas, Ky.
Filed June 10, 1959, Ser. No. 819,355
11 Claims. (Cl. 74—415)

This invention relates to a control member, and more particularly to a control member having means secured to and carried thereby which are individually adjustable for varying the operating characteristics of the member.

An object of the invention is to provide such a control member which, when suitably driven at a uniform rate or speed, may be utilized as a timer capable of delivering various preselected or predetermined intervals of time.

Broadly stated, the invention is directed to a control member which may be used in mechanical connection with electrical switches, valves, mechanical linkages or the like, for actuating said elements for operations at specific time intervals and/or for predetermined periods of time.

A primary object of the invention is to provide a control member having an outer surface, perimeter, or periphery which is selectively subdividable into lesser increments by means secured to and carried by said member.

Another object of the invention is to provide a plurality of individually adjustable slide or abutment means which are adapted to be releasably maintained either in fully advanced or fully retracted position with reference to the outer surface, perimeter or periphery of the aforesaid control member.

A further object of the invention is to provide a circular control member that can be pre-set to deliver rotary movement to a driven member in a precise, timed relationship. The rotary movement imparted to the driven member is intermittent and may be of either regular or irregular duration. For example, it may be desirable to impart rotary movement to the driven member at regular intervals of five minutes each, ten minutes each, etc., or at irregular intervals, for instance, one five minute, one ten minute, and succeeding fifteen minute intervals.

Another object is to provide a control member that can be readily reset to change the time intervals of the intermittent drive as often as desired. This change can be made in a matter of seconds without the used of tools. In addition to the ease and convenience of resetting, it is a still further object to provide means to positively maintain the desired setting during an unlimited period of operation.

Other objects and advantages of the present invention will be more readily apparent from the following detailed description of the accompanying drawings, in which:

FIG. 1 is a side elevation of the control member of the present invention in connection with a typical mechanism to be driven or controlled thereby.

FIG. 2 is a side elevation similar to FIG. 1, but illustrating a different timer setting of the control member.

FIG. 3 is an enlarged side elevational view of the control member of FIG. 2 with the spring plate removed for revealing the structural details of the member.

FIG. 4 is an enlarged top view of the said spring plate per se.

FIG. 5 is a sectional view taken on line 5—5 of FIG. 2.

FIG. 10 is a perspective view of the adjustable side or abutment of FIGS. 1, 2, 3, and 5.

Figure 6:
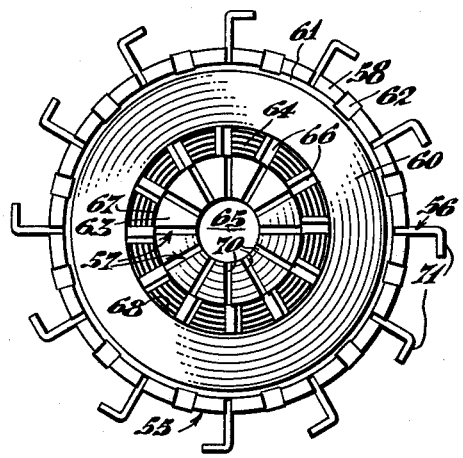
FIG. 6 is a view similar to FIG. 3, but illustrating a modified construction.

With particular reference now to FIGS. 1, 2 and 5, it will be noted that in one form of the invention the control member may comprise a circular body portion 15, a plurality of radially disposed slides or abutment elements 16, a spring plate 17, a washer 20 and a screw 21.

The body portion 15 comprises an outer surface or peripheral face 18 (FIG. 3), a forward axial face 22 having an annular recess, groove or cavity 23 therein, and a rearward axial face 19 (FIG. 5) which terminates in a hub 24 centrally bored as at 25. The forward end of bore 25 may be internally threaded to receive screw 21, whereas the opposite end of the bore is adapted to receive the end of drive shaft 50.

The spring plate 17 includes a central, continuous portion 26 having an opening 27 centrally thereof and a plurality of spring fingers 28 radiating outwardly from portion 26. This spring plate may be fabricated from a solid disk of suitable spring-like material provided with a plurality of equally spaced radial slots A, the innermost ends of which are preferably reduced in width, as clearly disclosed in FIG. 4.

As best illustrated in FIG. 3, body portion 15 is provided with a plurality of radially disposed slots 31 which extend throughout the entire width of axial face 22 between the outer peripheral surface 18 and the annular recess 23.

A slide or abutment element 16 is slidably received within each of slots 30.

With particular reference now to FIG. 10, it will be noted that slide or abutment element 16 includes a substantially flat central portion 32 having an inner end 33 and an outer end defined by an outturned lip 34 disposed in substantial parallelism with inner end 33. The central portion likewise includes side edges 35 and 36. A lug or ear 38 is formed in the central portion of edge 36 wherein said lug is in substantial spaced parallelism with lip 34.

Edge 35 contains an offset 44 for the purpose hereinafter more fully explained.

With reference now to FIG. 3, it will be noted that lip 34 is adapted to provide an abutment or stop member engageable with outer peripheral surface 18 of body member 15 for thereby defining the fully retracted position of a slide member; it will likewise be noted that lugs 38 are adapted to abuttingly engage the outer surface of annular recess 23 for defining the fully advanced position of a slide.

With reference now to FIG. 5, it will be noted that when a slide member has been shifted to a fully retracted position that edge 35 thereof below offset 44 will be disposed below the forward face 150 of slot 31 with which the slide is slidably associated whereby that portion of edge 35 outwardly of offset 44 will engage said surface 150. The slide will be securely though releasably maintained in this position against accidental or unintentional displacement by reason of the resilient force of spring finger 28 against the opposite side edge 36.

An offset 43 is provided in edge 36 for providing a shoulder engageable by outer end 45 of a spring finger when the slide has been pulled outwardly to the fully advanced position illustrated in the left side of FIG. 5. When the end 45 of a spring finger 28 has thus been seated in offset 43, offset 44 of opposite side 35 will be disposed under and in locking engagement with the outer periphery 18 of the body portion whereby the slide will be securely though releasably maintained in fully advanced position against accidental or unintentional dislodgment or displacement therefrom.

When in such a fully advanced position lug 38 will abut inner peripheral edge 40 of the annular recess 23 provided in axial face 22 of the body member.

In the preferred embodiment of the invention, the outer periphery of member 15 may be provided with an annular continuous arcuate groove 37 for providing a depression which will facilitate the insertion of a fingernail under lip 34 incident to the application of a positive force for shifting a slide member from a fully retracted to a fully advanced position. It should be further noted that lip 34 constitutes a stiffening member along the outer edge of each of the slides.

With reference to FIGS. 5 and 10, it will be noted that offsets 43 and 44 may be provided by undercutting side edges 36 and 35, respectively, as at 41 and 42.

With reference to FIGS. 3 and 5, it will be noted that annular recess 23 is constructed whereby to provide a central hub 124, the outer face of which is engaged by central portion 26 of the spring element 17.

From the foregoing, it will be apparent that each of the slides or abutment elements 16 will be securely though releasably maintained in a fully retracted position by means of spring fingers 17. Each of the slides may be individually shifted to a fully advanced position incident to the application of a force sufficient to overcome the frictional resistance of the retaining spring opposing such force.

It should likewise be understood that a slide or abutment element may be moved inwardly from a fully advanced position to a fully retracted position incident to the application of a force on the outer face of lip 34 sufficient to cause offset or abutment 44 to pass beneath the outer edge of face 150 and for causing the outer edge of spring finger 17 to ride upwardly over offset 43 onto side edge 36.

In other words, each of the slides or abutment elements may be moved from fully retracted to fully advanced position, or from fully advanced to fully retracted position by application of a pulling or pushing force thereto, and each of said slides or abutment elements will be securely though releasably retained in adjusted position against accidental or unintentional movement until application of a deliberate and positive force thereto.

With reference now to FIGS. 6, 7, 8, and 9, it will be noted that the modified control member is provided in general with a body portion 55 and slides or abutment elements 56 slidably received in a series of radially projecting slots 57 located in said body member in a manner similar to the provision of slots 31 in body portion 15 of the control member heretofore described.

Body 55 is provided with an annular lip 58 at one edge of its outer periphery which is adapted to receive a ring or washer 60 the outer periphery of which is suitably beveled as at 61 whereby annular lip 58 may be swaged over said bevel as at 62 for thereby rigidly securing ring 60 in place against body 55. In this manner the slides or abutment elements 56 are each slidably confined within their respective slots 57. The numeral 63 denotes a hub portion disposed centrally of an annular recess or groove 64 in the outer axial face of body 55. The hub is provided with a central mounting bore 65.

Figure 9:
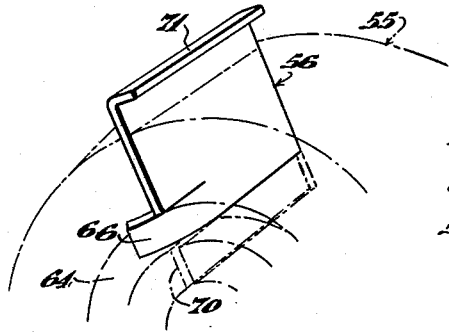
FIG. 9 is a perspective view of the adjustable slide or abutment of FIGS. 6, 7, and 8.

As best illustrated in FIG. 9, an offset ear or lug 66 extends outwardly from an inner corner of the slide element 56, said ear or lug being located within the annular groove 64 between outer face 67 of hub 63 and inner face 68 of ring 60 when said slide is in its fully advanced position.

Slides 56 cannot be retracted until the offset ear or lug 66 has been manually shifted in response to the application of a positive force thereto for shifting ear 66 into alignment with hub portion 70 of slot 57 with which it is associated, after which the slide may be then fully retracted until outer lip 71 engages the outer periphery of the body member for limiting further inward movement of the stop.

Stops or abutment plates are preferably made of spring material, wherefore when shifted from a fully retracted to a fully advanced position, ears 66 will spring back into their respective offset configuration upon entering groove 64, whereupon the slides or abutment elements will be securely though releasably anchored in fully advanced position.

Figure 8:
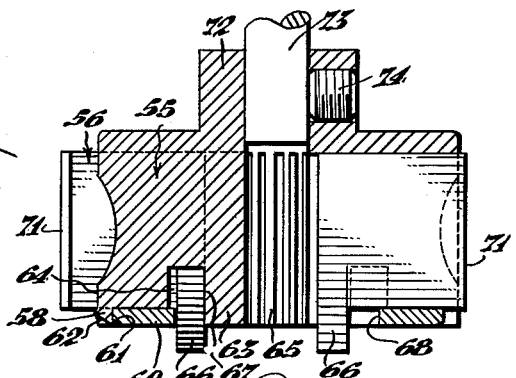
FIG. 8 is a sectional view taken on line 8—8 of the control member of FIG. 7 when secured to a drive shaft.

As best illustrated in FIG. 8, center bore 65 extends through a hub 72 formed integral with the rear side of the body member to receive drive shaft 73, to which it may be anchored by means of a set screw 74, or the like.

With particular reference now to FIGS. 1 and 2, I have illustrated, solely by way of example, a typical installation utilizing a control member embodying the teachings of the present invention. As there disclosed, the various slides or abutment elements of the control member have been pre-set to deliver predetermined, periodic impulses or movement to ratchet wheel 75.

It should be understood that each stop member, when in a fully advanced position, will contact the radially disposed faces 76 of the ratchet teeth 77 of ratchet wheel 75 for thereby imparting a driving force thereto.

In FIG. 1 the control member has been illustrated as being driven by a suitable synchronous motor denoted generally by the numeral 51. Since each of the slides has been illustrated in a fully advanced position, counter-clockwise rotation of the control member will impart a clockwise rotary motion to ratchet 75. As illustrated in FIG. 1, each successive slide member will engage each successive ratchet tooth, and if it be assumed that the control member makes one revolution per hour, each slide member will engage a ratchet tooth at five-minute intervals, since 12 slide members have been illustrated. FIG. 2 differs from FIG. 1 in that every third slide member is in fully advanced position with the intermediate slide members being in fully retracted position whereby, again assuming that the control member will make one complete revolution in an hour, each succeeding ratchet tooth of the ratchet wheel will be advanced one tooth each at fifteen-minute intervals.

Figure 7:
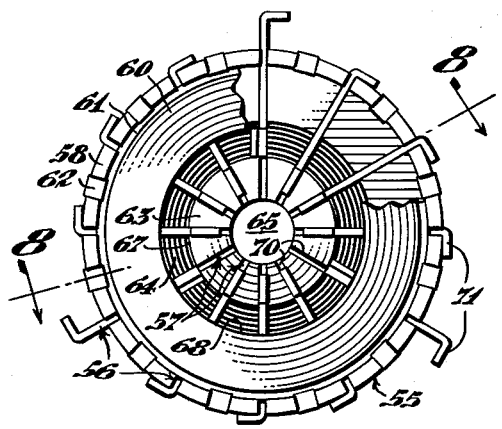
FIG. 7 is a view similar to FIG. 6 with parts thereof broken away for clarity of detail and understanding and illustrating a different timing cycle.

In FIG. 7 the slide members have been arranged whereby the outer periphery of the control member has been divided into thirds whereby ratchet wheel 75 would be advanced one tooth each twenty-minute interval.

From the foregoing, it will be noted that I have thus provided simple yet highly effective means on a control member for providing a series of abutments or slides which are slidably associated therewith whereby to be selectively disposed in fully retracted or fully advanced positions in order that when in a fully advanced position they will form a control surface.

In practice the ratchet wheel 75 may, by way of example, be operatively connected to an electric switch, valve, mechanical linkage or the like, to control a desired, timed function or operation.

Figure 11:
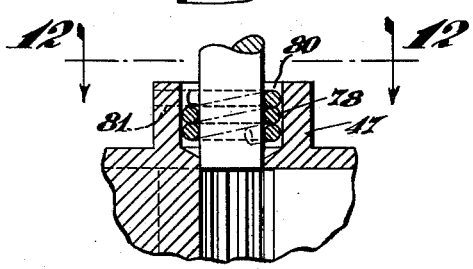
FIG. 11 is a fragmentary sectional view illustrating a modified means for securing a control member to a drive shaft.
Figure 12:
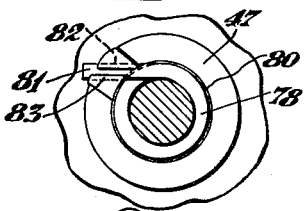
FIG. 12 is a sectional view taken on line 12—12 of FIG. 11.

With reference now to FIGS. 11 and 12, I have disclosed clutch type attachment means for a control member in lieu of the positive attachment means illustrated in FIGS. 5 and 8. Such clutch type attachment means may comprise an overriding clutch spring 78 confined within a counter-bore 80 in hubs 47 and/or 72. One end 81 of clutch spring 78 is rigidly anchored within a slot 82 in the hub, such as by means of swaging 83. The provision of such a clutch mounting facilitates assembly and servicing of the device in the event that it may become desirable or necessary to manually rotate the control member relative to the drive shaft on which it is mounted. With the overriding clutch illustrated in FIGS. 11 and 12, the control member of FIGS. 1 and 2 may be easily rotated in a counter-clockwise direction, however when the drive shaft upon which the control member is mounted rotates in a counter-clockwise direction, the clutch spring 78 will immediately establish a firm driving connection between the shaft and control member.

It should be understood that various changes and modifications in the structural details of the device may be made, within the scope of the appended claims, without departing from the spirit of the invention.

What is claimed is:

1. A control member comprising a body having an axial face and an outer peripheral surface normal thereto, and an inner surface in substantial spaced parallelism with said outer surface, a slot in said axial face normal to and extending between said inner and outer surfaces, a slide received within said slot, an outer lip and an inner lip integral with said slide, said inner and outer lips adapted to abut said inner and outer surfaces, respectively, for defining the fully advanced and fully retracted positions of said slide, the inner lip of the slide being resiliently biased relative to the plane of the slot, to lock the slide upon the body against retraction when said inner lip leaves the slot incident to full advancement of the slide.

2. A control member as defined in claim 1, wherein the spacing between the adjacent faces of said inner and outer lips exceeds the spacing between the inner and outer surfaces of said body by the overall travel of said slide between its fully advanced and fully retracted positions.

3. A control member comprising a circular body having an outer peripheral surface and a pair of axial faces one of which is provided with an annular recess which defines an inner surface in substantial spaced parallelism with said outer surface, a plurality of radially disposed slots in the recessed face of said body normal to and extending between said inner and outer surfaces, a plurality of slides individually shiftable one within each of said slots, an inner and an outer stop on each of said slides, said inner and outer stops adapted to engage the said respective inner and outer surfaces of said body for defining the fully advanced and fully retracted positions of said slides, respectively the inner stop of each slide being resiliently biased within a slot when the slide is retracted, said stops being displaceable from the slots upon full advancement of the slides, and means on the body providing abutments against which the displaced stops impinge for locking the slides against accidental retraction.

4. In a control member as defined in claim 3, means spanning said slots for precluding endwise removal of the slides therefrom.

5. A control member comprising a circular body having an outer peripheral surface and an axial face having an annular recess therein which defines an inner surface in substantial spaced parallelism with said outer surface, a plurality of radial slots in said axial face, said slots disposed normal to and extending between said inner and outer surfaces, a plurality of slides movable one within each of said slots, said slides having inner, outer and spaced side edges, resilient retaining means secured to and carried by said body, said means spanning said slots and resiliently engaging a side edge of each of said slides for precluding endwise removal of said slides from their respective slots, and stop means on each of said slides for defining their respective fully retracted and fully advanced positions relative to said body.

6. A control member comprising a circular body having an outer peripheral surface and an axial face, said face having an annular recess therein for defining an annular hub having an outer peripheral edge in spaced parallelism with an inner surface spaced from the said outer surface of said body, a plurality of radial slots in said axial face, a plurality of slides received one within each of said slots, each of said slides comprising a flat body portion including inner, outer and spaced side edges, one of said side edges adjacent its inner end having an ear projecting outwardly therefrom, said ear normally and yieldably disposed out of the mean plane of said body portion, said ear receivable in the slot of said hub when the slide is in a fully retracted position, said ear adapted to flex out of the plane of said slot and engage the peripheral edge of said hub when the slide is in fully advanced position for releasably locking said slide in fully advanced position against accidental or unintentional retraction.

7. A control member comprising a circular body having an outer peripheral surface and an axial face which is provided with an annular recess having an inner, an outer, and an end wall, said recess defining a central hub spaced from said outer surface, a plurality of radially disposed slots in said axial face and hub, a plurality of slides shiftably received one within each of said radial slots for movement between fully advanced and fully retracted positions, each of said slides comprising a substantially flat body portion having inner, outer and spaced side edges, said outer ends terminating in an outturned lip, one of said side edges having an outturned lip above its respective inner edge in substantial spaced parallelism with said first lip, wherein the said first mentioned lip of each of said slides is adapted to overlie the outer peripheral surface of said body adjacent its respective slot when the slide is in a fully retracted position, said other lip of each of said slides adapted to engage the outer end wall of said recess when an abutment element is in a fully advanced position, and means releasably securing said slides in and against accidental or unintentional displacement from one or the other of said positions.

8. A control member comprising a circular body having an outer peripheral surface and an axial face, said face having an annular recess therein for defining an annular hub having an outer peripheral edge in spaced parallelism with an inner surface spaced from the said outer peripheral surface of said body, a plurality of radial slots in said axial face and hub, a plurality of slides adjustably received one within each of said radial slots, each of said slides comprising a flat body portion including inner, outer and spaced side edges, one of said side edges adjacent its inner end having an ear projecting outwardly therefrom, said ear normally and yieldably disposed out of the mean plane of said body portion, said ear receivable in the slot of said hub when said slide is in a fully retracted position, said ear adapted to flex out of the plane of its respective slot incident to movement of said slide from retracted to advanced position, to engage the said inner surface of said body to define the fully advanced position of said slide relative to said body, said ear when flexed out of the plane of its slot also engaging the outer peripheral edge of said hub for releasably locking said slide in fully advanced position against accidental or unintentional retraction therefrom.

9. A control member comprising a circular body having an outer periphery, a plurality of adjustable slides slidably received within said body for individual radial movement between fully advanced and fully retracted positions with reference to said peripheral surface, means integral with each slide engageable with said body for defining the fully advanced position of said slide with reference to said member, other means integral with each slide engageable with said body for defining the fully retracted position of said slide with reference to said member, and means associated with each slide, and including a single resilient element disposed exteriorly of the control member body, for individually releasably holding a plural number of said slides selectively in the fully advanced and fully retracted positions.

10. A control member comprising a circular body having an axial face and an outer peripheral surface normal thereto, and an inner surface in substantial spaced concentricity with said outer surface, a slot in said axial face normal to and extending between said inner and outer surfaces, a slide received within said slot, an outer lip and an inner lip integral with said slide, said inner and outer lips adapted to abut said inner and outer surfaces, respectively, for defining the fully advanced and fully retracted positions of said slide, the inner lip of the slide being resiliently biased relative to the plane of the slot, to lock the slide upon the body against retraction when said inner lip leaves the slot incident to full advancement of the slide, said inner lip being extended laterally from the slide and beyond the limits of the control member body, for exposure to manipulation by flexing to replace said inner lip manually within its slot.

11. The device as set forth in claim 10, wherein the combination includes a slide retaining ring fixed upon the axial face of the body and overlying a portion of the slide, to preclude displacement of the slide axially of the body in one direction.

References Cited in the file of this patent

UNITED STATES PATENTS

| | | |
|---|---|---|
| 1,957,394 | Heinitz | May 1, 1934 |
| 2,163,277 | Hartmann | June 20, 1939 |
| 2,428,195 | Breeding | Sept. 30, 1947 |
| 2,536,133 | Klammer | Jan. 2, 1951 |
| 2,705,065 | Kloss | Mar. 29, 1955 |
| 2,742,126 | Morton | Apr. 17, 1956 |
| 2,888,833 | Toderick | June 2, 1959 |
| 2,915,158 | Smith | Dec. 1, 1959 |